(12) United States Patent
Jung

(10) Patent No.: US 11,610,700 B2
(45) Date of Patent: Mar. 21, 2023

(54) FFC CABLE ASSEMBLY

(71) Applicant: LG Energy Solution, Ltd., Seoul (KR)

(72) Inventor: Sang-Eun Jung, Daejeon (KR)

(73) Assignee: LG Energy Solution, Ltd.

( * ) Notice: Subject to any disclaimer, the term of this patent is extended or adjusted under 35 U.S.C. 154(b) by 0 days.

(21) Appl. No.: 17/422,261

(22) PCT Filed: Jul. 27, 2020

(86) PCT No.: PCT/KR2020/009887
§ 371 (c)(1),
(2) Date: Jul. 12, 2021

(87) PCT Pub. No.: WO2021/075677
PCT Pub. Date: Apr. 22, 2021

(65) Prior Publication Data
US 2022/0148758 A1      May 12, 2022

(30) Foreign Application Priority Data

Oct. 14, 2019   (KR) .................. 10-2019-0127252

(51) Int. Cl.
| | | |
|---|---|---|
| H01B 7/04 | (2006.01) | |
| H01M 50/502 | (2021.01) | |
| H01B 7/02 | (2006.01) | |
| H01B 7/08 | (2006.01) | |
| H01B 7/18 | (2006.01) | |
| H01B 9/00 | (2006.01) | |

(52) U.S. Cl.
CPC .............. H01B 7/041 (2013.01); H01B 7/02 (2013.01); H01B 7/0823 (2013.01); H01B 7/18 (2013.01); H01B 9/006 (2013.01); H01M 50/502 (2021.01)

(58) Field of Classification Search
CPC ............ H01B 7/02; H01B 7/04; H01B 7/041; H01B 7/06; H01B 7/08; H01B 7/0823; H01B 7/18; H01B 9/006
USPC ...... 174/110 R, 113 R, 117 R, 117 F, 117 FF
See application file for complete search history.

(56) References Cited

U.S. PATENT DOCUMENTS

| 6,323,428 B1 | 11/2001 | Takano |
| 2014/0094049 A1 | 4/2014 | Ohyama et al. |
| 2018/0174716 A1* | 6/2018 | Kominato ........ H01B 13/01254 |
| 2018/0358721 A1 | 12/2018 | Kioschis et al. |

(Continued)

FOREIGN PATENT DOCUMENTS

| CN | 106410451 B | 1/2019 |
| EP | 0977335 A2 | 2/2000 |
| JP | H07220826 A | 8/1995 |

(Continued)

OTHER PUBLICATIONS

Extended European Search Report including Written Opinion for Application No. 20876310.2 dated Jul. 12, 2022, pp. 1-11.

(Continued)

*Primary Examiner* — William H. Mayo, III
(74) *Attorney, Agent, or Firm* — Lerner, David, Littenberg, Krumholz & Mentlik, LLP

(57) ABSTRACT

A flat flexible cable (FFC) assembly, which includes a multi-FFC cable having a plurality of FFC films arranged in a layered form and an insulation tube for surrounding the plurality of FFC films, and a pair of high current terminals mounted to respective ends of the multi-FFC cable.

13 Claims, 5 Drawing Sheets

(56) References Cited

U.S. PATENT DOCUMENTS

2020/0212618 A1     7/2020  Kim et al.
2020/0389005 A1 *  12/2020  Koizumi ............. B60R 16/0215

FOREIGN PATENT DOCUMENTS

| | | | |
|---|---|---|---|
| JP |   0977335 A2 * |  7/1999 | ............. H02G 11/00 |
| JP | 2000050472 A   |  2/2000 | |
| JP | 2002238141 A   |  8/2002 | |
| JP | 2003235128 A   |  8/2003 | |
| JP | 2007115493 A   |  5/2007 | |
| JP | 2007234322 A   |  9/2007 | |
| JP |   1010529 B2   | 11/2007 | |
| JP | 2017168246 A   |  9/2017 | |
| JP | 2018068049 A   |  4/2018 | |
| JP | 2019033068 A   |  2/2019 | |
| KR | 20140018428 A  |  2/2014 | |
| KR |   101754871 B1 |  7/2017 | |
| KR | 20190055724 A  |  5/2019 | |

OTHER PUBLICATIONS

Partial Supplementary European Search Report including Written Opinion for Application No. 20876310.2 dated May 12, 2022, pp. 1-12.
International Search Report for Application No. PCT/KR2020/009887 dated Oct. 28, 2020, 3 pages.

* cited by examiner

FFC CABLE ASSEMBLY

CROSS-REFERENCE TO RELATED APPLICATIONS

The present application is a national phase entry under 35 U.S.C. § 371 of International Application No. PCT/KR2020/009887 filed Jul. 27, 2020, published in Korean, which claims priority from Korean Patent Application No. 10-2019-0127252 filed Oct. 14, 2019, all of which are incorporated herein by reference.

TECHNICAL FIELD

The present disclosure relates to a flat flexible cable (FFC) assembly, and more particularly, to a FFC cable assembly capable of coping with high voltage and high current.

The present application claims priority to Korean Patent Application No. 10-2019-0127252 filed on Oct. 14, 2019 in the Republic of Korea, the disclosures of which are incorporated herein by reference.

BACKGROUND ART

Secondary batteries currently commercialized include nickel cadmium batteries, nickel hydrogen batteries, nickel zinc batteries, lithium secondary batteries and so on. Among them, the lithium secondary batteries are more highlighted in comparison to nickel-based secondary batteries due to advantages such as free charging and discharging, caused by substantially no memory effect, very low self-discharge rate, and high energy density.

In recent years, secondary batteries are widely used not only for small-sized devices such as portable electronic devices, but also in middle-sized or large-sized devices such as electric vehicles and power storage devices (ESS). For example, when used in an electric vehicle, a plurality of such battery modules, in which a large number of secondary batteries are electrically connected, are connected to configure a battery pack in order to increase energy capacity and output.

As an electrical connection means for the battery modules, a wire or bus bar 1 capable of coping with high voltage and high current is used. The high-voltage or high-current wire has disadvantages of greater weight and volume compared to ordinary wires. However, the bus bar 1 (see FIG. 1) is an electrical component prepared by coating a copper or aluminum plate 2 having good electrical conductivity with an insulation tube 3 or the like and thus has sufficient energization capability even with small width and thickness. For this reason, the bus bar 1 is widely used as an electrical component of a battery pack. However, since a large number of bus bars are used in the battery pack, the total weight of the battery pack increases, and the material cost also becomes a considerable burden.

Accordingly, there is an increasing need for a new electrical connection means that is more economical and lighter than the bus bar while capable of coping with high voltage and high current.

SUMMARY

Technical Problem

The present disclosure is directed to providing an electrical connection means that is more economical and lighter than a conventional bus bar while capable of coping with high voltage and high current.

Other objects and advantages of the present disclosure will be described below, and will be appreciated by embodiments of the present disclosure. In addition, the objects and advantages of the present disclosure can be realized by components defined in the claims and a combination thereof.

Technical Solution

In one aspect of the present disclosure, there is provided a FFC cable assembly, comprising: a multi-FFC cable including a plurality of FFC films arranged in a layered form and an insulation tube for surrounding the plurality of FFC films; and a pair of high current terminals mounted to respective ends of the multi-FFC cable.

The insulation tube may be a thermally shrinkable tube.

Each of the plurality of FFC films may include: two or more conductor wires coplanar and parallel to each other; and a sheath member surrounding and sealing the conductor wires.

End portions of the conductor wires may extend along a longitudinal direction and may be exposed out of the insulation tube, and the multi-FFC cable may further include a conductor wire holder having a plurality of slots formed therein and the end portions of the conductor wires are inserted into respective slots of the plurality of slots, and the conductor wire holder surrounds both ends of the insulation tube.

The conductor wire holder may be fitted into both ends of the insulation tube.

The conductor wire holder may be made of one of copper (Cu) and aluminum (Al) materials.

The conductor wire holder may be compressed to both ends of the insulation tube in a thickness direction of the multi-FFC cable.

The high current terminal may include: a vice portion fitted into an outer side of the conductor wire holder; and a terminal portion protruding from the vice portion in one direction, wherein the terminal portion has a predetermined thickness.

The vice portion may include: an opening in at least one surface of the vice portion exposing at least one surface of the conductor wire holder along a thickness direction of the multi-FFC cable; and a compression member elastically deformed inside the opening and compressing a portion of the conductor wire holder.

In another aspect of the present disclosure, there is also provided a battery pack, comprising the FFC cable assembly described of any of the embodiments described herein.

Advantageous Effects

According to an embodiment of the present disclosure, it is possible to provide a FFC cable assembly, which may serve as an electrical connection means that is more economical and lighter than a conventional bus bar while capable of coping with high voltage and high current.

The effects of the present disclosure are not limited to the above, and effects not mentioned herein may be clearly understood from the present specification and the accompanying drawings by those skilled in the art.

DETAILED DESCRIPTION

Hereinafter, preferred embodiments of the present disclosure will be described in detail with reference to the accompanying drawings. Prior to the description, it should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

Therefore, the description proposed herein is just a preferable example for the purpose of illustrations only, not intended to limit the scope of the disclosure, so it should be understood that other equivalents and modifications could be made thereto without departing from the scope of the disclosure.

A FFC (Flat Flexible Cable) cable assembly described below may be used, for example, to connect two battery modules in series, to electrically connect a terminal of a battery module to a relay or to electrically connect devices inside a battery pack.

Of course, the FFC cable assembly according to the present disclosure is not limitedly used as an electrical component of a battery pack. That is, the FFC cable assembly may also be used as an electrical connection component for various devices or equipment through which high voltage or high current flows.

Figure 1:
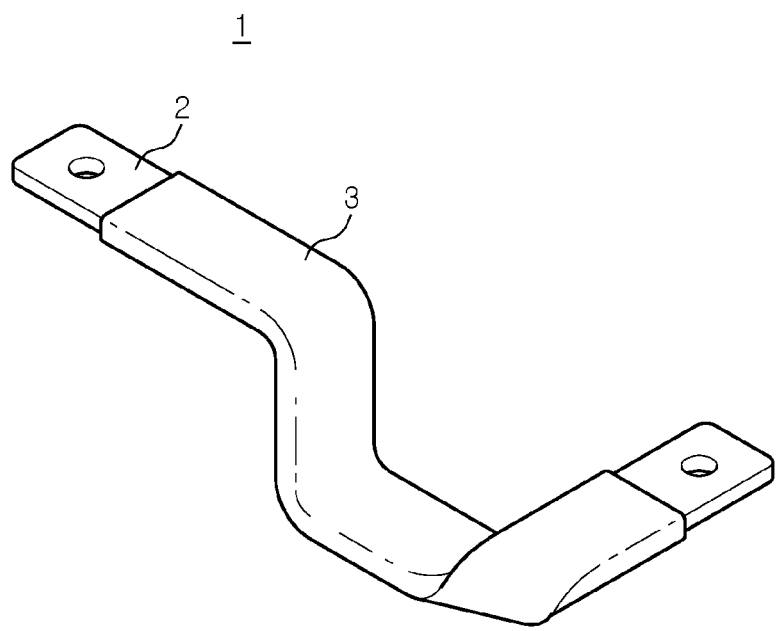
FIG. 1 is a schematic perspective view showing a conventional flexible bus bar.
Figure 2:
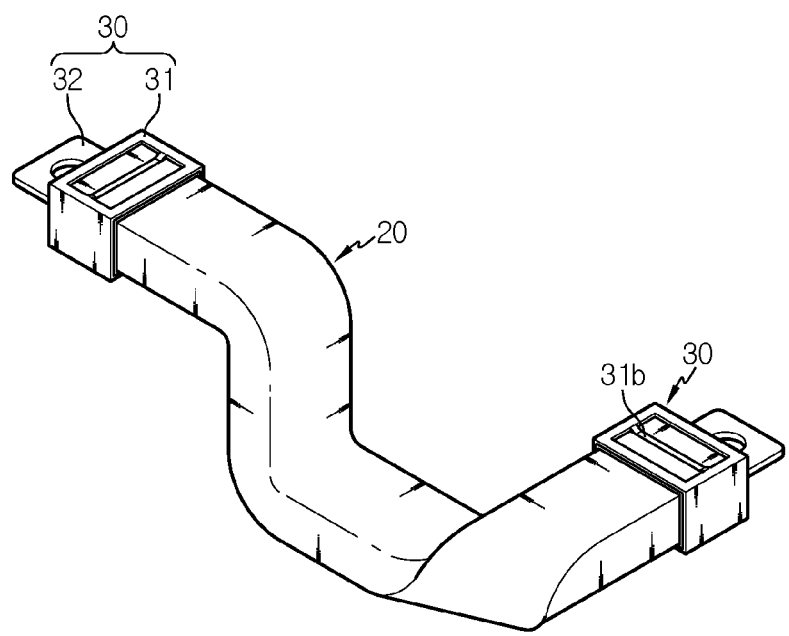
FIG. 2 is a schematic perspective view showing a FFC cable assembly according to an embodiment of the present disclosure.
Figure 3:
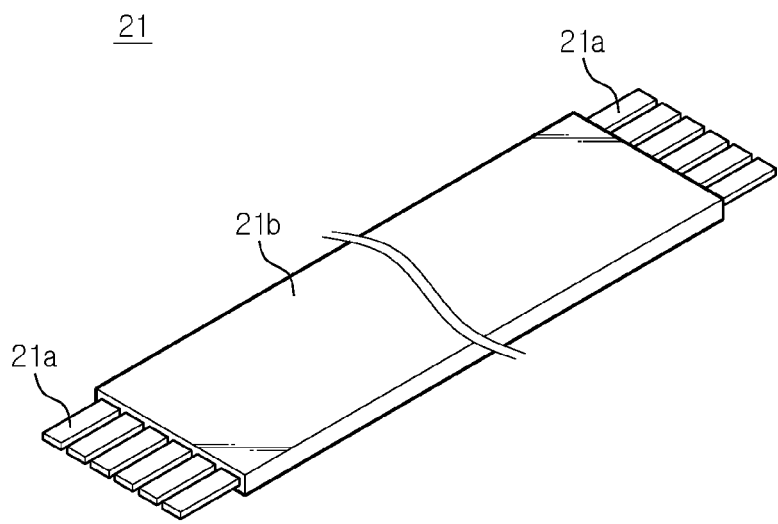
FIG. 3 is a diagram showing one FFC film that configures a multi-FFC cable of FIG. 2.
Figure 4:
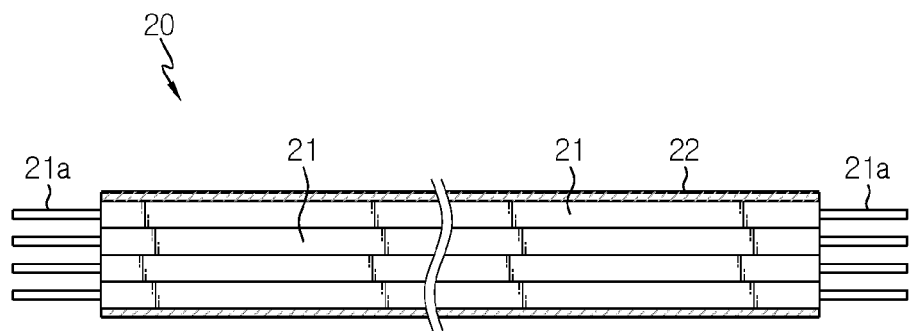
FIG. 4 is a diagram showing a stacking structure of the multi-FFC cable according to an embodiment of the present disclosure.
Figure 5:
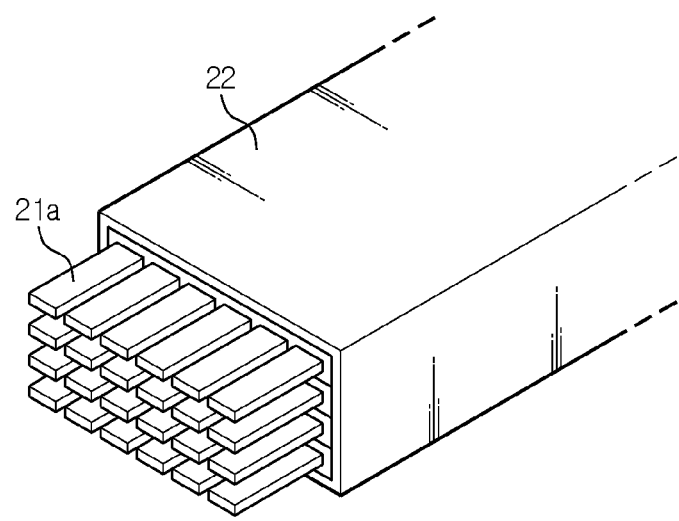
FIG. 5 is a perspective view showing one end of the multi-FFC cable of FIG. 4.

FIG. 2 is a schematic perspective view showing a FFC cable assembly according to an embodiment of the present disclosure, FIG. 3 is a diagram showing one FFC film that configures a multi-FFC cable of FIG. 2, FIG. 4 is a diagram showing a stacking structure of the multi-FFC cable according to an embodiment of the present disclosure, and FIG. 5 is a perspective view showing one end of the multi-FFC cable of FIG. 4.

Referring to these drawings, an FFC cable assembly 10 according to an embodiment of the present disclosure includes a multi-FFC cable 20 and high current terminals 30 mounted to both ends of the multi-FFC cable 20.

The multi-FFC cable 20 may include a plurality of PBC films 21 arranged in a layered form and an insulation tube 22 for surrounding the plurality of FFC films 21.

A unit FFC film 21 includes two or more conductor wires 21a parallel to each other on the same plane and a sheath member 21b configured to surround and seal the conductor wires 21a, as shown in FIG. 3. The unit FFC film 21 may be manufactured thin to have a thickness of about 0.5 mm to 2 mm. The unit FFC film 21 has advantages of light weight and good flexibility.

In addition, the level of conduction current that may be handled per each conductor wire 21a may vary depending on the configuration of the conductor wire 21a, but in general cases, each of the conductor wires 21a of the unit FFC film 21 may cope with a current of approximately 3 A. Therefore, if being simply calculated excluding heat generation, 10 conductor wires 21a may cope with a current of about 30 A, and if 10 unit FFC films 21 are stacked in 10 layers, it is possible to cope with a current of about 300 A.

In the present disclosure, based on the above, as shown in FIG. 4, unit FFC films 21 are stacked in multiple layers to form the multi-FFC cable 20 so as to cope with high voltage and high current. The multi-FFC cable 20 depicted in the drawings is a stack of four unit FFC films 21 for convenience of drawing, but the scope of the present disclosure is not limited thereto. That is, if it is intended to further increase the level of current that may be coped with compared to this embodiment, the number of unit FFC films 21 may be increased as much.

The insulation tube 22 is made of a material with a heat shrinkable property and functions to surround and bind the plurality of stacked FFC films 21 so that the FFC films 21 are not shaken. By using the insulation tube 22, the plurality of FFC films 21 may be integrally bundled to be twisted or bent as one body.

Meanwhile, the high current terminals 30 are provided at both ends of the multi-FFC cable 20 as a means for facilitating connection or fastening between the multi-FFC cable 20 and an opponent object (for example, a terminal of a battery module).

The high current terminal 30 may adopt a vice method in which both ends of the multi-FFC cable 20 are fitted and fixed therein. At this time, it is important to secure electrical contact and fixability between each conductor wire 21a of the plurality of FFC films 21 and the high current terminal 30. This embodiment has the following configuration to solve this issue.

In the multi-FFC cable 20 according to this embodiment, as shown in FIG. 5, the end portions of the conductor wires 21a of each unit FFC film 21 may be further extended out of the sheath member 21b along a longitudinal direction so as to be exposed out of the insulation tube 22.

In addition, the multi-FFC cable 20 may further include a conductor wire holder 23 to align and fix the end portions of the conductor wires 21a.

The conductor wire holder 23 may be made of one of copper (Cu) and aluminum (Al) materials, have a plurality of slots formed therein so that the end portions of the conductor wires 21a individually pass therethrough, and be configured to surround both ends of the insulation tube 22.

Figure 6:
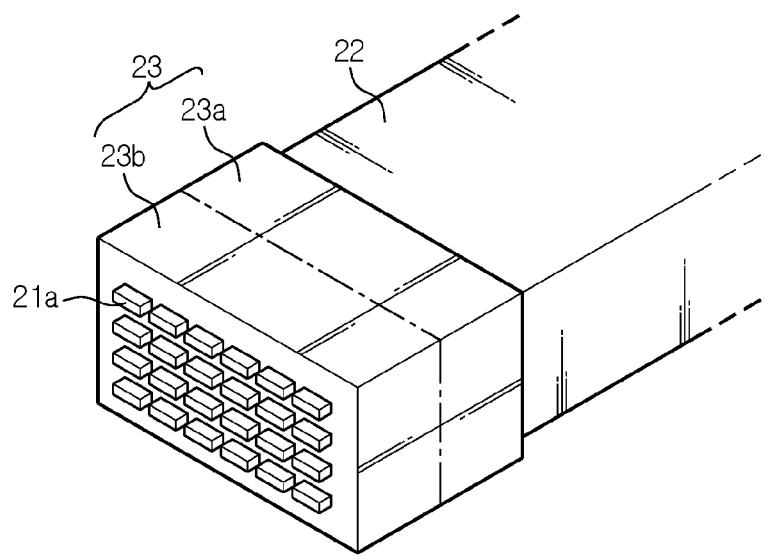
FIG. 6 is a perspective view showing one end of the multi-FFC cable to which a conductor wire holder is mounted in comparison to FIG. 5.

More specifically, as shown in FIG. 6, a rear end 23a of the conductor wire holder 23 may have a tubular shape and be fitted into an outer side of the insulation tube 22, and a front end 23b of the conductor wire holder 23 may have a plurality of slots prepared therein by partition walls formed in horizontal and vertical directions. Also, the conductor wires 21a may be individually inserted into and fixed to the slots, respectively.

In the drawings, the conductor wires 21a are configured to pass through the slots and protrude out of the conductor wire holder 23, but the conductor wires 21a may not protrude but be located inside the slots.

According to the conductor wire holder 23 as above, both ends of the plurality of FFC films 21 may be held, so it is possible to prevent some of the plurality of FFC films 21 from sticking out or moving out in a longitudinal direction, and the interval between the conductor wires 21a may be kept constant in upper, lower, front, rear, left and right directions.

After the conductor wire holder 23 is mounted to both ends of the insulation tube 22, the conductor wire holder 23 may be compressed once more in a thickness direction so that the conductor wire holder 23 is not easily separated. The high current terminal 30 may be mounted on the outer side of the conductor wire holder 23.

The high current terminal 30 is a means for connecting an opponent object (for example, a terminal of a battery module) to the multi-FFC cable 20, and includes a vice portion 31 and a terminal portion 32.

Figure 7:
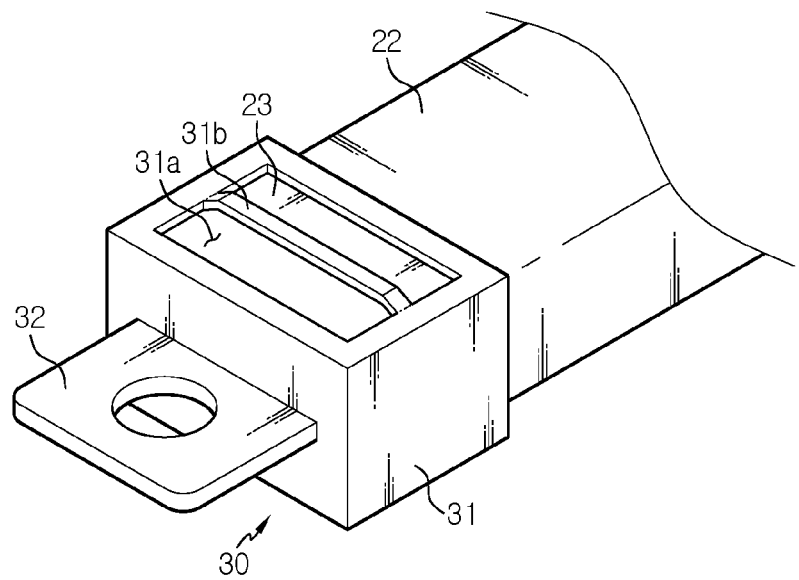
FIG. 7 is a perspective view showing one end of the multi-FFC cable according to an embodiment of the present disclosure to which a high current terminal is mounted.
Figure 8:
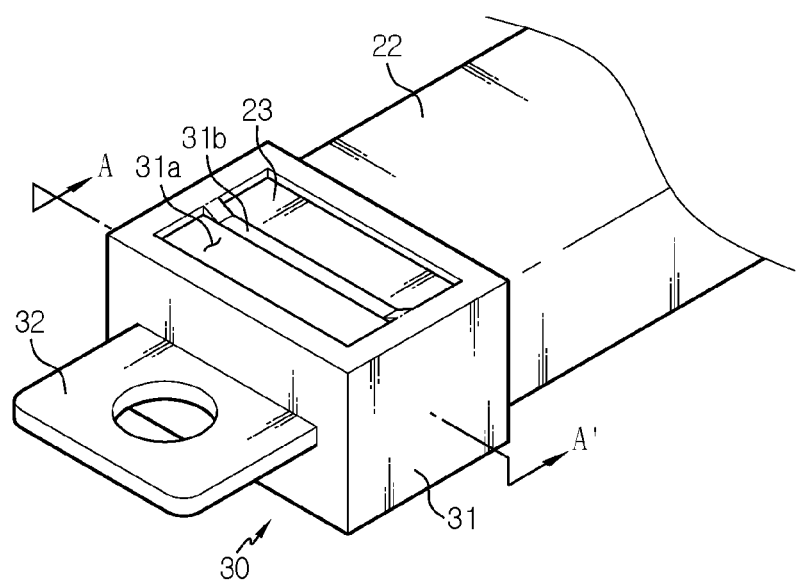
FIG. 8 is a perspective view showing one end of the multi-FFC cable, which is compressed by a compression member of the high current terminal in comparison to FIG. 7.

Referring to FIGS. 7 and 8, the vice portion 31 is provided in a socket shape that is fitted into the outer side of the conductor wire holder 23, and the terminal portion 32 protrudes with a predetermined thickness from the vice portion 31 along a longitudinal direction. The vice portion 31 and the terminal portion 32 are conceptually divided and may be formed integrally.

Specifically, the vice portion 31 may include an opening 31a provided in an open shape to expose at least one surface of the conductor wire holder 23 along the thickness direction of the multi-FFC cable 20, and a compression member 31b elastically deformed inside the opening 31a to compresses a portion of the conductor wire holder 23.

In other words, the vice portion 31 includes the opening 31a in one side surface thereof located at a top layer along the stacking direction of the FFC film 21 and the other side surface thereof located at a bottom layer, and this may be, for example, a window frame structure.

In addition, one end and the other end of the compression member 31b are connected to one side and the other side of the edge of the vice portion 31, respectively, and has a convex shape protruding out of the opening 31a. Thus, if a force is applied to the convex portion, the compression member 31b may be deformed into a concave shape depressed into the opening 31a to compress a portion of the conductor wire holder 23. Here, a groove may be formed in a portion of the conductor wire holder 23 so that the compression member 31b may be partially inserted therein.

Figure 9:
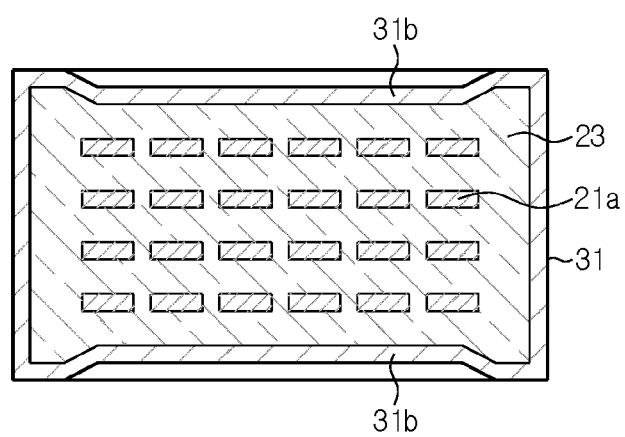
FIG. 9 is a schematic sectional view, taken along the line A-A' of FIG. 8.

That is, if the multi-FFC cable 20 is fitted into the vice portion 31 and then the compression member 31b is pressed, as shown in FIGS. 8 to 9, the conductor wire holder 23 may be compressed in the thickness direction. Accordingly, the high current terminal 30 and the multi-FFC cable 20 may be sufficiently fixed.

Of course, since the conductor wires 21a of the FFC films 21 are confined within the conductor wire holder 23 made of metal material and the conductor wire holder 23 is confined in the vice portion 31, the electrical contact stability between the high current terminal 30 and the multi-FFC cable 20 may also be sufficiently secured.

The terminal portion 32 may be provided in the form of a plate protruding from the center of a front end of the vice portion 31. The terminal portion 32 may further have a hole for fastening a bolt or screw to the terminal of the opponent object. The terminal portion 32 may be similar to the shape of an end portion of a conventional bus bar.

As described above, the FFC cable assembly 10 is a stack of the plurality of FFC films 21 and is capable of coping with high voltage and high current while being much lighter than the conventional bus bar with the same current level. Thus, even if a large number of FFC cable assemblies 10 are used in a battery pack, the total weight of the battery pack is not significantly increased.

In addition, since the FFC cable assembly 10 may be twisted or bent, the FFC cable assembly 10 may be used not only for straight paths but also for complex paths. Also, the FFC cable assembly 10 may be advantageously manufactured at an economical cost compared to the existing wire or bus bar.

Meanwhile, the battery pack according to the present disclosure may include the FFC cable assembly 10 described above. The FFC cable assembly 10 may be applied to connect two battery modules in series with each other, to electrically connect a terminal of a battery module to a relay or to electrically connect devices inside the battery pack.

In addition to the FFC cable assembly 10, the battery pack may further include at least one battery module having a cell stack, which is an assembly of a plurality of battery cells, and a control device for controlling charging/discharging and current flow of the battery cells based on voltage and temperature of the battery cells, such as a fuse, a relay and a battery management system (BMS).

The present disclosure has been described in detail. However, it should be understood that the detailed description and specific examples, while indicating preferred embodiments of the disclosure, are given by way of illustration only, since various changes and modifications within the scope of the disclosure will become apparent to those skilled in the art from this detailed description.

Meanwhile, even though the terms expressing directions such as "upper", "lower", "left" and "right" are used in the specification, they are just for convenience of description and can be expressed differently depending on the location of a viewer or a subject, as apparent to those skilled in the art.

What is claimed is:

1. A flat flexible cable (FFC) assembly, comprising:
    a multi-FFC cable including a plurality of FFC films arranged in a layered form and an insulation tube for surrounding the plurality of FFC films, wherein each of the plurality of FFC films includes:
        two or more conductor wires coplanar and parallel to each other; and
        a sheath member surrounding and sealing the conductor wires;
    a conductor wire holder fitted to an outer side of the insulation tube surrounding the plurality of FFC films at an end of the multi-FFC cable, the conductor wire holder including a plurality of slots aligned with the conductor wires of the plurality of FFC films, wherein the plurality of slots are configured to receive the conductor wires; and
    a pair of high current terminals mounted to respective ends of the multi-FFC cable.

2. The FFC cable assembly according to claim 1, wherein the insulation tube is a thermally shrinkable tube.

3. The FFC cable assembly according to claim 1, wherein end portions of the conductor wires extend along a longitudinal direction and are exposed out of the insulation tube, and wherein the end portions of the conductor wires are inserted into the plurality of slots, and wherein the conductor wire holder surrounds both ends of the insulation tube.

4. The FFC cable assembly according to claim 3, wherein the conductor wire holder is fitted into both ends of the insulation tube.

5. The FFC cable assembly according to claim 3, wherein the conductor wire holder is made of one of copper (Cu) and aluminum (Al) materials.

6. The FFC cable assembly according to claim 3, wherein the conductor wire holder is compressed to both ends of the insulation tube in a thickness direction of the multi-FFC cable.

7. The FFC cable assembly according to claim 3, wherein each high current terminal includes:
a vice portion fitted into an outer side of the conductor wire holder; and
a terminal portion protruding from the vice portion in one direction, wherein the terminal portion has a predetermined thickness.

8. The FFC cable assembly according to claim 7, wherein the vice portion includes:
an opening in at least one surface of the vice portion exposing at least one surface of the conductor wire holder along a thickness direction of the multi-FFC cable; and
a compression member elastically deformed inside the opening and compressing a portion of the conductor wire holder.

9. A battery pack, comprising the FFC assembly according to claim 1.

10. The FFC cable assembly according to claim 1, wherein the pair of high current terminals are configured to connect battery modules to one another and to carry high current between the battery modules.

11. The FFC cable assembly according to claim 10, wherein the high current is between 30 A and 300 A.

12. The FFC cable assembly according to claim 1, wherein the plurality of slots are arranged in a two-dimensional array.

13. The FFC cable assembly according to claim 12, wherein each slot of the plurality of slots is configured to receive a respective conductive wire.

* * * * *